(12) United States Patent
Kobierecki et al.

(10) Patent No.: US 12,103,250 B2
(45) Date of Patent: Oct. 1, 2024

(54) DEVICE COMPRISING MULTIPLE LONGITUDINAL MANDRELS FORMING A MOLD FOR MANUFACTURING A COMPOSITE PART

(71) Applicant: Airbus Operations S.L., Getafe (ES)

(72) Inventors: Robert Kobierecki, Getafe (ES); Alberto Balsa-Gonzalez, Getafe (ES); Jose Luis Lozano Garcia, Getafe (ES)

(73) Assignee: Airbus Operations S.L., Getafe (ES)

( * ) Notice: Subject to any disclaimer, the term of this patent is extended or adjusted under 35 U.S.C. 154(b) by 69 days.

(21) Appl. No.: 17/874,576

(22) Filed: Jul. 27, 2022

(65) Prior Publication Data

US 2023/0033860 A1 Feb. 2, 2023

(30) Foreign Application Priority Data

Jul. 29, 2021 (EP) .................................. 21382713

(51) Int. Cl.
*B29C 70/44* (2006.01)
*B29C 33/50* (2006.01)
*B29C 70/54* (2006.01)
*B29L 31/30* (2006.01)

(52) U.S. Cl.
CPC ............ *B29C 70/44* (2013.01); *B29C 33/505* (2013.01); *B29C 70/54* (2013.01); *B29L 2031/3085* (2013.01)

(58) Field of Classification Search
CPC ..... B29C 70/44; B29C 70/54; B29C 33/5605; B29L 2031/3085
See application file for complete search history.

(56) References Cited

U.S. PATENT DOCUMENTS

| 1,645,729 | A | 10/1927 | Vaughan |
| 9,592,640 | B2 | 3/2017 | Hoffmeister et al. |
| 9,757,876 | B2 | 9/2017 | Broeska et al. |
| 2013/0181374 | A1 | 7/2013 | Ender |
| 2018/0207840 | A1 | 7/2018 | Register |
| 2018/0236694 | A1 | 8/2018 | Eisch et al. |
| 2020/0108526 | A1 | 4/2020 | Dark |

FOREIGN PATENT DOCUMENTS

| CA | 2865655 A1 | 9/2013 |
| EP | 3354448 A1 | 8/2018 |
| WO | 2014099841 A1 | 6/2014 |
| WO | 2017071852 A2 | 5/2017 |

OTHER PUBLICATIONS

European Search Report; priority document.

*Primary Examiner* — Jeffrey M Wollschlager
*Assistant Examiner* — Xue H Liu
(74) *Attorney, Agent, or Firm* — Greer, Burns & Crain, Ltd.

(57) ABSTRACT

A device and a process for manufacturing a composite part, the device comprising four molding mandrels that can be arranged in a mold arrangement in which they form a mold for the composite part, as well as a locking mandrel configured to lock the molding mandrels in the mold arrangement and to be extracted from between the molding mandrels to release the molding mandrels from their mold arrangement. The locking mandrel extends from one longitudinal end of the molding mandrels to another opposite longitudinal end of the molding mandrels.

12 Claims, 11 Drawing Sheets

DEVICE COMPRISING MULTIPLE LONGITUDINAL MANDRELS FORMING A MOLD FOR MANUFACTURING A COMPOSITE PART

CROSS-REFERENCES TO RELATED APPLICATIONS

This application claims the benefit of the European patent application No. 21382713.2 filed on Jul. 29, 2021, the entire disclosures of which are incorporated herein by way of reference.

FIELD OF THE INVENTION

The invention relates to a device for manufacturing a composite part. In particular, the invention relates to devices forming a modular mold for molding and forming composite parts.

BACKGROUND OF THE INVENTION

Certain composite parts may have complex shapes. In particular, some composite parts may comprise a cavity and be hollow so as to ensure they are light. This is particularly the case in aeronautics in which some parts of an aircraft may have to have a certain external shape with aerodynamic purposes but are required to be hollow so as to remain light and to accommodate systems installation in their interior. The optimization of the thickness and thus of the weight of each part may require internal cavities to have complex shapes, including concave portions with a wider section than an opening in the finished part.

Also, some portions of aircraft are still assembled out of multiple parts, for example through riveting. But the emergence of new materials, such as composite materials allow allow a reduction of the number of parts and a formation of some portions of an aircraft as one part or with a limited number of parts.

From these two requirements emerge new problems such as molding a part from the inside so as to form a cavity while allowing the removal of the inner mold.

Some solutions have been described, for example in CA2865655, in which the mold is dissolved after the forming of the part. However, such tooling consumes a lot of resources, and the chemical involved may be harmful for the environment and damage the composite part. Some materials may be dissolved by water, but then require specific conditions of moisture before use so that they are not damaged before use. Besides, such manufacturing methods may be revealed to be too slow for mass manufacturing. Moreover, the mold must be reconstructed for each composite part manufactured by these methods.

In other solutions, mandrels are assembled to form an inner mold and are extracted through an opening in the composite part. In U.S. Pat. No. 9,592,640 two tool components are used as mandrels to shape a shell component, and are extracted laterally from the component after is curing. However, such an embodiment is not adapted to composite parts with a cavity having a closed section. Besides, the tool components may only be extracted along inclined sides of the shell component to be extracted and do not allow component with an internal concave shape.

In the document, Thompson, Eric J., "Design of a multi-piece removable mandrel mold tool to fabricate and control inner mold surface contour of a composite wing spar" (2010), Graduate Theses, Dissertations, and Problem Reports, 4664, the author proposes different concepts. In one solution, a segmented mandrel is presented in which a central rod ties all of the mandrel sections together to act as a solid tool. This rod can be accessed from the open root end of the part to be removed. However, this concept does not allow an easy extraction of each and all of the parts of the segmented mandrel when a composite part has been cured on it.

Such solution and other concepts described in this document do not provide an industrially applicable solution to the general problem of the manufacturing of a hollow composite part with a section that is wider than its end opening.

The invention aims to provide a solution to this problem.

SUMMARY OF THE INVENTION

The invention aims to provide a device and a method which allow the manufacture of such a composite part.

The invention proposes a device and a method which are effective and may be reproduced many times with the same mandrels.

The invention proposes a solution that is economic in the frame of producing multiple identical composite parts.

The invention also intends to provide a solution that is environmentally friendly as it does not need chemicals or single-use materials.

The invention specifically proposes a device that can be easily extracted from the composite part formed.

The invention proposes a solution that provides better quality composite parts.

The invention also intends to propose a solution that provides a facilitated manufacturing process.

The invention proposes a device and a method that provides more freedom to composite parts design.

The invention proposes a device for manufacturing a composite part comprising:
  at least four mandrels, called molding mandrels, configured to:
    be placed at least partially in contact with said composite part, and
    to be arranged in a mold arrangement in which the molding mandrels form at least part of a mold for molding the composite part,
  a fifth mandrel, called locking mandrel, configured to:
  be at least partially placed between the molding mandrels so as to maintain the molding mandrels in the mold arrangement, and
  be extracted from between the molding mandrels so as to release the molding mandrels from the composite part,
  characterized in that the locking mandrel is adapted to extend, when placed between the molding mandrels, from one longitudinal end of the molding mandrels to another opposite longitudinal end of the molding mandrels.

The molding mandrels and the locking mandrel, together the mandrels, may be brought together in one or more arrangements so as to form a mold for a composite part. In particular, the mandrels may form an inner mold for the composite part; that is, a mold for an at least partially closed portion of the composite part.

The composite part may comprise a first longitudinal end, called a root, and a second longitudinal end, called a tip, opposite the root. This is particularly the case for composite parts such as wings or horizontal tail planes, as well as other flight control elements, such as elevators, for example. Nonetheless, the invention's benefit extends to many other technical areas than aeronautics, such as the manufacturing of wind turbines blades, for example.

The composite part may comprise at least one cavity extending from its root to its tip. Often, the root opening formed by the cavity at the root is wider than the tip opening formed by the cavity at the tip. The mandrels may thus be inserted in the cavity and extracted out of the cavity through the root opening of the composite part.

Similarly, each molding mandrel and locking mandrel has a first longitudinal end, called root, and a second longitudinal end, called tip, opposite the root. In the whole text, "longitudinally" is to be understood as along a longitudinal direction of a part, such as the locking mandrel, the molding mandrels or the composite part. Similarly, "cross-section" is to be understood as in a section orthogonal to this longitudinal direction.

The molding mandrels extend longitudinally on at least the whole length of the cavity to be formed in the composite part being manufactured. The locking mandrel thus also extends longitudinally on at least the whole length of the cavity to be formed in the composite part being manufactured.

The tip of the locking mandrel and of the molding mandrels may beneficially have a smaller cross-section than the cross-section of the root of, respectively, the LL and each molding mandrel. In embodiments in which both the root and the tip of the composite part are open, the extraction of the locking mandrel from within the molding mandrels may be facilitated by a push or a knock on the tip end of the locking mandrel.

Also, because the locking mandrel extends from the root until the tip of the molding mandrels, the extraction of the molding mandrels is facilitated. Indeed, the molding mandrels may stick to the composite part. Composite parts generally comprise a resin which, even after curing, can appear tacky. Therefore, there is some adhesion between the molding parts, such as the molding mandrels and the composite part. This adhesion must be overcome for extracting the molding mandrels from within the composite part. It is much easier to overcome this adhesion with a device according to the invention. Indeed, since the locking mandrel extends along the whole length of the molding mandrels, when the locking mandrel has been removed from between the molding mandrels, the molding mandrels may be displaced away from the composite part surface towards the cavity occupied by the locking mandrel instead of being slid against the surface of the composite part on their whole length.

The device may also comprise skin molds configured to provide a molding surface on the outer surface of the composite part.

Furthermore, the device according to the invention may also comprise actuators for maintaining the mandrels and/or the skin molds at their position, and in some instances exert a pressuring force on the composite part during its manufacturing.

The composite part may be a hollow part.

The composite part may be a hollow part with a section forming a closed cell. At least one cross-section of the part forms a closed wall. Thereby the molding device according to the invention may not be extracted toward a lateral side of the composite part and may only be extracted from the hollow space of the composite part through a longitudinal end opening of the composite part.

The molding mandrels and the locking mandrel may be inserted and extracted longitudinally in the composite part.

The molding mandrels and the locking mandrel may be adapted so that when the locking mandrel is in between the molding mandrels in the mold arrangement, the locking mandrel may not contact the composite part.

In some embodiments of the invention, only the molding mandrels may be in contact with the composite part. When the mandrels are brought together, the locking mandrel is entirely enclosed in between the molding mandrels. The locking mandrel may thus not be in contact with the composite part. Thereby any tackiness or adhesion between the composite part and the locking mandrel is avoided. The locking mandrel may therefore be easily extracted from within the molding mandrels.

Also, the shape of the locking mandrel does not depend on the shape of the composite part, but only on the shape of the internal faces of the molding mandrels placed together in the mold arrangement. The shape of the locking mandrel and of the molding mandrels may thus be designed so as to facilitate the extraction of the ML from between the molding mandrels.

In the mold arrangement, each molding mandrel may be in contact with at most two distinct faces of the composite part.

The composite part may comprise multiple faces. Each face may be a substantially planar surface with a different orientation than other faces. However, a purely mathematical definition of a face may not be given here as any face may have one or more curvatures and be linked to another adjacent surface, not by an angle but by a curved portion of smaller radius than the face itself. In particular, a cavity in which the mandrels are inserted to form the cavity may comprise multiple faces. The combination of mandrels may form multiple faces.

However, ensuring that each molding mandrel only makes contact with, at most, two different faces, provides a molding mandrel, and more generally a device, in which extracting each molding mandrel from the composite part is facilitated. Indeed, whatever the angle between two faces, the molding mandrel may be separated from the composite surface towards a space left void by the extraction of the locking mandrel along a direction which comprises at least one non-null component orthogonally to each of the two faces. On the contrary, if the molding mandrel were making contact with more than two faces, its extraction would be more complicated.

As a consequence, each molding mandrel only forms one angle of the cavity shape in the composite part.

In some embodiments, the device comprises only four molding mandrels and only one locking mandrel.

A configuration with at least four molding mandrels and at least one fifth mandrel acting as locking mandrel is particularly beneficial in the invention. Having at least four molding mandrels allows that two molding mandrels may have no contact between them in the mold arrangement, such that they may move independently from each other towards the space left open by the locking mandrel when extracted from between the molding mandrels.

More particularly, having no more than four molding mandrels is also beneficial in that the fewer parts there are, the more economical the device is and the more easy the molding and demolding processes are. Similarly, having only one locking mandrel may be a beneficial result.

Also, in embodiments in which the composite part has a hollow section with four faces, each molding mandrel may form only one angle of the mold.

The locking mandrel may have a hexagonal cross-section.

A hexagonal cross-section of the locking mandrel may allow the locking mandrel to be in contact with a first molding mandrel along a first face, and a second molding mandrel on a second face opposite the first face. The other four faces of the locking mandrel may form angles with the first face and the second face adapted for the first molding mandrel and the second molding mandrel to be displaced towards the space let open by the locking mandrel when extracted from the mold arrangement. The four other faces of the locking mandrel may form angles with the first face and the second face which are in a same plane as the faces of the first molding mandrel and the second molding mandrel in contact with the third molding mandrel and the fourth molding mandrel.

At least one molding mandrel, called a primary molding mandrel, locks at least one other molding mandrel, called a secondary molding mandrel, in its mold arrangement position.

The molding mandrels and the locking mandrel are arranged such that the locking mandrel may first be extracted longitudinally from the mold arrangement. Then one or more primary molding mandrels may be extracted by a radial displacement towards the space left open by the locking mandrel, and then longitudinally from the root of the composite part. The secondary molding mandrels may then be extracted by a radial displacement towards the space left open by the locking mandrel and the two first molding mandrels, and then longitudinally from the root of the composite part.

The dimensions of the locking mandrel and each molding mandrel, particularly the primary molding mandrels which are to be extracted first to allow the extraction of further secondary molding mandrels, must be calculated according to the shape of the cavity of the composite part.

Indeed, a device according to the invention is particularly beneficial for hollow composite parts with a cross-section wider than the root opening or tip opening of the cavity formed by the hollow composite part, such that a conventional one-part mandrel may not be extracted through its root or tip. Thereby, the greater the difference of sizes between the widest cross-section of the cavity and the root, the bigger the cross-section of the locking mandrel and the primary molding mandrels relatively to the cross-section of the secondary molding mandrels must be in order to allow for all the molding mandrels to be extracted through the root opening.

The primary molding mandrel may form less surface of the mold than the secondary molding mandrel.

The primary molding mandrel contacts a lesser amount of surface of the composite part than the secondary molding mandrel.

Since the primary molding mandrels must be extracted before the secondary molding mandrels, their degrees of freedom and space available to be displaced radially or laterally towards the space left open by the extraction of the locking mandrel is smaller, and thereby their extraction is facilitated if their surface in contact with the tacky composite part is limited. The secondary molding mandrels, on the contrary, may have more surface in contact with the composite parts because they are the last ones extracted from the composite part and thereby their radial displacement is facilitated by a wider open space.

A primary molding mandrel may have two faces in contact with one or more secondary molding mandrel, and these two faces may form an angle of between 3 degrees and 45 degrees.

The inventors have determined that such angle range facilitates the extraction of the primary molding mandrels towards the space left open after the extraction of the locking mandrel.

Depending on the embodiments, in the mold arrangement, these two faces of the primary molding mandrel may be in contact with faces of two different secondary molding mandrels, or one face in contact with a secondary molding mandrel and another face in contact with the composite part.

The two faces of the primary molding mandrel in contact with one or more secondary molding mandrel form an angle of 180 degrees or more with faces of the locking mandrel, such that when the locking mandrel is extracted from the mold arrangement, the primary molding mandrel may be extracted towards the locking mandrel. In some embodiments, the two faces of the primary molding mandrel in contact with one or more secondary molding mandrels are coplanar with two faces of the locking mandrel in the mold arrangement.

In some embodiments, the device may comprise two primary molding mandrels forming opposite angles of a mold arrangement.

The inventors have determined that such arrangement facilitates the demolding of both the primary molding mandrels and the secondary molding mandrels.

In such embodiments, two or more secondary molding mandrels will form the other opposite angles of the mold arrangement. In particular, in a generally rectangular cross-section mold arrangement, two primary molding mandrels may form opposite angles of the mold arrangement, and another two secondary molding mandrels may form the other two opposite angles of the mold arrangement.

More generally, in some embodiments, each molding mandrel may only form one angle of the mold arrangement between two faces of the mold arrangement. Thereby, each molding mandrel is in contact with at most two faces and one angle between these faces of the composite part, thereby reducing their trapping in the composite face at the time of extracting the molding mandrel. Indeed, with such a characteristic, there is always at least one direction in which the molding mandrel may be translated away from the inner surface of the composite part before being extracted through a root opening.

More generally, in a device according to the invention, each molding mandrel may be designed such that when the locking mandrel is removed from between the molding mandrels, each molding mandrel may be displaced (for some of them sequentially after other molding mandrels have been removed from the composite part's cavity) in a direction having a component perpendicular to each of the face of the molding mandrel in contact with the surface of the composite part.

An external face of a molding mandrel adapted to form at least part of the mold is concave.

One of the benefits of the invention being to provide a re-usable mold for hollow parts with non-linear tapered shape but with internal concave and/or convex shapes. More particularly, the invention provides a re-usable mold for hollow parts with at least one trapped section having a cross-section wider than its root opening or tip opening. More generally, the invention provides a re-usable mold for hollow parts with at least one trapped section having a cross-section wider than the cross-section of at least one section located between said trapped section and a tip opening and wider than the cross-section of at least one other section located between said trapped section and a root opening.

A concave/convex shape of the cavity in the hollow composite part may be provided by one or more molding mandrels having an external convex (respectively concave) shape. The concave/convex surface of the molding mandrel is to be in contact with the composite part when forming the composite part with the locking mandrel and molding mandrels in the mold arrangement.

On the contrary, the faces of the locking mandrel are rectilinear and are neither concave nor convex. Similarly, the faces of the molding mandrels to be in contact with the locking mandrel are rectilinear and are neither concave nor convex.

The locking mandrel is conical in shape—or tapered; the tip of the locking mandrel is of smaller cross section than a cross section of its root, but the locking mandrel is not restricted to circular cross-section embodiments. This allows the locking mandrel to be easily extracted through the root opening of a cavity of a hollow composite part. The angle of the conical shapes of the external surfaces of the locking mandrel is at least 0.2 degrees, preferably at least 0.5 degrees, and most preferably about 1 degree.

In some embodiments, the device may comprise multiple sets, each set comprising at least four molding mandrels and at least one locking mandrel.

Having a plurality of sets and using them simultaneously allows the manufacture of complex hollow composite parts with multiple cavities. For example, a wing, a horizontal tail plane or a vertical tail plane with multiple spars may be fabricated at once as one composite part thanks to a molding device of the invention.

The locking mandrel may be inflatable.

An inflatable locking mandrel may further facilitate its introduction in between the molding mandrels while deflated. In particular, the introduction of the inflatable locking mandrel between the molding mandrels in the mold arrangement may be facilitated as it extends, when placed between the molding mandrels, from one longitudinal end of the molding mandrels until another opposite longitudinal end of the molding mandrels. Indeed, such characteristic allows the inflatable locking mandrel to be easily pulled from a root opening to a tip opening of a space left open between the molding mandrels in the mold arrangement.

Inflating the locking mandrel to a predetermined sufficient pressure allows a locking of the molding mandrels in their mold arrangement. The molding mandrels may comprise further locking devices so as to not be displaced away from their mold arrangement by an over-pressurized locking mandrel.

The extraction of the locking mandrel from between the molding mandrels in the mold arrangement is also facilitated as it simply needs to be deflated for its surface to separate from the surfaces of the molding mandrels. The extraction of the locking mandrel from between the molding mandrels thereby does not involve any (or negligible) friction with the molding mandrels.

The invention also extends to a method for the manufacturing of a composite part in which:
  at least four mandrels, called molding mandrels
  are arranged in a mold arrangement in which the molding mandrels are at least partially in contact with the composite part so as to form at least part of a mold for molding the composite part, and
  a fifth mandrel, called a locking mandrel,
  is at least partially placed between the molding mandrels so as to maintain the molding mandrels in the mold arrangement, and
  is extracted from between the molding mandrels to allow releasing the molding mandrels from the composite part,
  in which the locking mandrel extends, when placed between the molding mandrels, from one longitudinal end of the molding mandrels to another opposite longitudinal end of the molding mandrels.

Once the composite part has been formed around the mold formed by the mandrels, the mandrels are extracted from within the composite part. in particular, for forming a cavity in a hollow composite part, the mandrels form, in the mold arrangement, an inner mold for forming this cavity.

In a method according to the invention, once the locking mandrel has been extracted from between the molding mandrels, each molding mandrel may be displaced towards a volume left open by the extraction of the locking mandrel from between the molding mandrels. The molding mandrels may be extracted sequentially from a cavity within the composite part. The molding mandrels may be extracted individually or in groups. To be extracted from a cavity in the composite part, each molding mandrel is displaced so that its surface in contact with the composite part is separated from the composite part, and is then displaced out of the cavity through an opening in the composite part. The opening may, for example, be a root opening in a wing composite part.

In a method according to the invention, elements for forming the composite part may be placed on the mandrels. Such elements may be pre-cured composite parts, or pre-impregnated fibers, etc. In particular, dry fibers or pre-impregnated fibers may be placed on a set of molding mandrels and locking mandrel, so as to form the composite part. Dry fibers would then be impregnated with a resin. The composite part may be pre-cured by subjecting it to heat.

Multiple pre-cured composite parts, each with their set of molding mandrels and locking mandrels arranged as a mold arrangement within, may be brought together, and co-cured together so as to form a complex composite part with multiple cavities. When the pre-cured composite parts are brought together, additional molds or jigs may be used, such as skin molds for maintaining and forming a skin coating around the complex composite part.

The molding mandrels and locking mandrels are then extracted from the cavities.

In some embodiments, a process of the invention comprises extracting at least one first primary molding mandrel before extracting at least one secondary molding mandrel, the secondary molding mandrel being locked between the composite part and the at least one primary molding mandrel in the mold arrangement.

In the mold arrangement, the one or more primary molding mandrels may lock the one or more secondary molding mandrels in place. The locking mandrel may further lock the primary molding mandrels and in some embodiments, at least partially, also lock the secondary molding mandrel in their mold arrangement.

In some embodiments, a process of the invention comprises inflating the locking mandrel between the molding mandrels so as to lock the molding mandrels in the mold arrangement.

The extraction of a deflated locking mandrel may be facilitated compared to a solid locking mandrel, and may even allow more complex shapes of an inner cavity in a hollow composite part.

The invention also extends to other possible combinations of features described in the above description and in the following description relative to the figures.

In particular, the invention extends to a device for manufacturing a composite part comprising:
- at least four mandrels, called molding mandrels, adapted to:
  - be placed at least partially in contact with said composite part, and
  - to be arranged in a mold arrangement in which the molding mandrels form at least part of a mold for molding the composite part,
- a fifth mandrel, called locking mandrel, adapted to:
- be at least partially placed between the molding mandrels so as to maintain the molding mandrels in the mold arrangement, and
- be extracted from between the molding mandrels so as to release the molding mandrels from the composite part,
- characterized in that the molding mandrels and the locking mandrel are adapted so that when the locking mandrel is in between the molding mandrel in the mold arrangement, the locking mandrel may not contact the composite part.

The invention the invention also extends to a device for manufacturing a composite part comprising:
- at least four mandrels, called molding mandrels, configured to:
- be placed at least partially in contact with the composite part, and
- to be arranged in a mold arrangement in which the molding mandrels form at least part of a mold for molding the composite part,
- a fifth mandrel, called a locking mandrel, configured to:
- be at least partially placed between the molding mandrels so as to maintain the molding mandrels in the mold arrangement, and
- be extracted from between the molding mandrels so as to release the molding mandrels from the composite part,
- characterized in that, independently of other features herein described, in the mold arrangement, each molding mandrel may be in contact with at most two distinct faces of the composite part.

A device and method of the invention provide design simplification of a composite part because there are fewer restrictions on the composite part design due to the demolding process.

With a device and method of the invention the demolding of the composite part is facilitated.

More importantly, a device and method of the invention provide significant manufacturing damage reduction. Indeed, since the molding mandrels are first extracted with some orthogonal component from the inner surface of the composite part, the possibility of composite delamination during demolding is greatly reduced.

The invention extends to devices comprising features described in relation to the method for manufacturing a composite part and the invention extends to methods comprising features described in relation to the device for manufacturing a composite part.

BRIEF DESCRIPTION OF THE DRAWINGS

Some specific exemplary embodiments and aspects of the invention are described in the following description in reference to the accompanying figures.

DETAILED DESCRIPTION OF THE PREFERRED EMBODIMENTS

Figure 1:
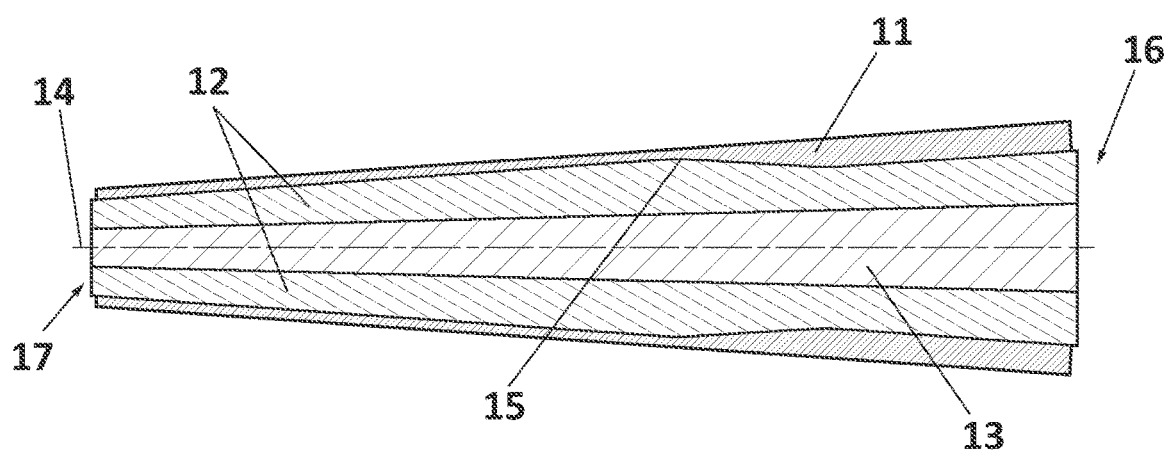
FIG. 1 is a schematic representation of a longitudinal cross-section of a first embodiment of a device according to the invention.

In FIG. 1, a device according the invention is presented. The device comprises a locking mandrel 13 in place between a plurality of molding mandrels 12. The molding mandrels 12 and the locking mandrel are in a mold arrangement in which they form a shape for molding a composite part 11 on it. The mold arrangement is such that the locking mandrel 13 is not in direct contact with the composite part 11 at any moment.

In this embodiment the composite part 11 is placed on the mandrels 12, 13 and is cured with the mandrels 12, 13 in the mold arrangement within the composite part 11. The composite part surrounds the mandrels 12, 13 and forms a closed shape around the mandrels when viewed in cross-section.

The composite part shown in this embodiment may be a part of an aircraft wing, such as a portion of a wing box. The composite part 11 is hollow once the mandrels 12, 13 are extracted from within the composite part. This allows the obtaining of a light composite part, as well as to use the inner cavity formed to install system or transport goods such as fuel, for example.

The composite part 11 has a proximal opening, or root opening 16, which may correspond to a root of the wing, situated at one longitudinal end of the composite part along a longitudinal axis 14. It also has a distal opening, or tip opening 17, at an opposite longitudinal end of the composite part, which may correspond to a tip opening.

When arranged in the mold arrangement, the molding mandrels 12 extend at least from the root opening 16 to the tip opening 17. Similarly, when the locking mandrel 13 is placed between the molding mandrels 12 in the mold arrangement, the locking mandrel 13 extends at least from the root opening 16 to the tip opening 17.

Figure 2A:
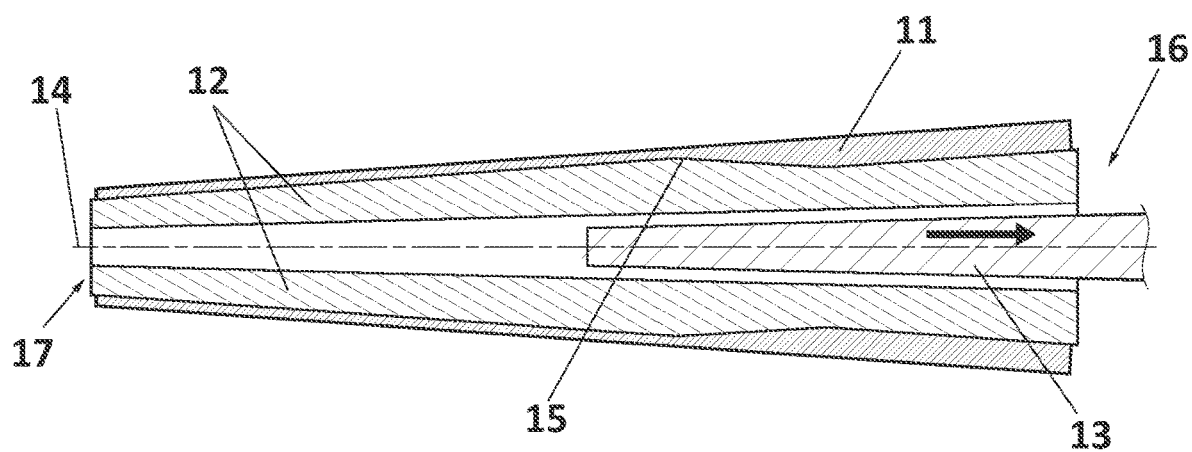
FIGS. 2a, 2b, 2c are schematic representations of steps of a method according to the invention with a device corresponding to that of FIG. 1.

The molding mandrels 12 and the locking mandrel 13 are accessible from the root opening 16 and from the tip opening 17, such that the locking mandrel 13, in particular, may be extracted longitudinally through the root opening, as can be seen on FIG. 2a. This may be facilitated by having a direct access to a tip end of the locking mandrel 13 which extends from one longitudinal end of the molding mandrels 12 until another opposite longitudinal end of the molding mandrels 12 when in the mold arrangement. Indeed, an operator may exert a pressure or a shock on the tip end of the locking mandrel 13 to facilitate its extraction through the opposite root opening 16 in the composite part 11.

Therefore, in a first step to extract the mandrels 12, 13 from the composite part 11, the locking mandrel 13 is extracted longitudinally through a longitudinal opening of the composite part. In this embodiment, the root opening 16 is wider than the tip opening 17. The locking mandrel 13 is therefore extracted through the root opening 16.

The locking mandrel 13 has a conical shape with a root end wider than its tip end. This facilitates the extraction of the locking mandrel 13 from between the other mandrels 12, because there is significant friction between the locking mandrel 13 and the molding mandrels 12 only at the beginning of the extraction of the locking mandrel 13.

In order to minimize the use of composite, as well as to minimize the weight of the composite part, the cavity 18 of the composite part does not have a conical shape. Rather, the cavity 18 has a trapped section 15 with a trapped cross-section wider than a first cross-section situated towards the tip opening 17 along the longitudinal axis 14 and wider than a second cross-section situated towards the root opening 16 along the longitudinal axis 14.

This trapped section 15 impedes to use a one-piece non-dissolvable mandrel to form the composite part 11.

Figure 2B:
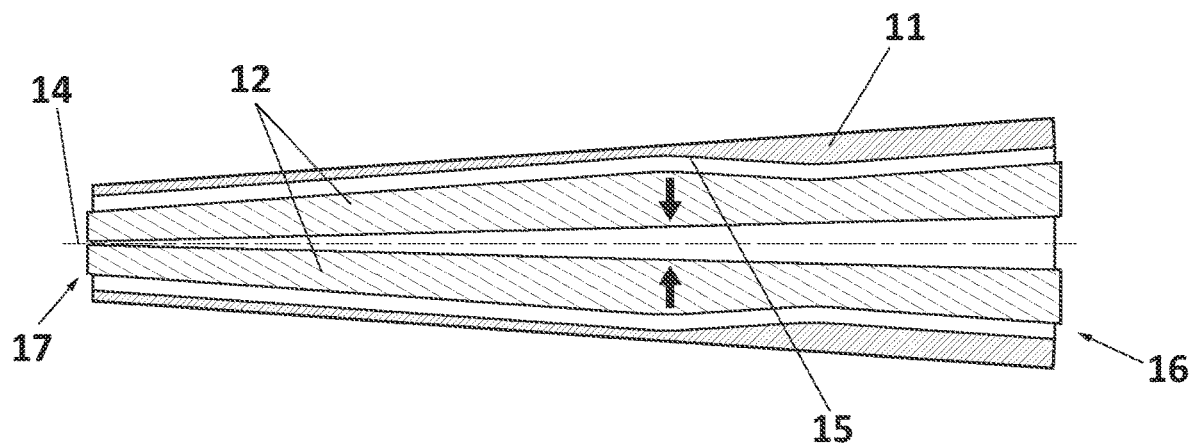
Figure 2C:
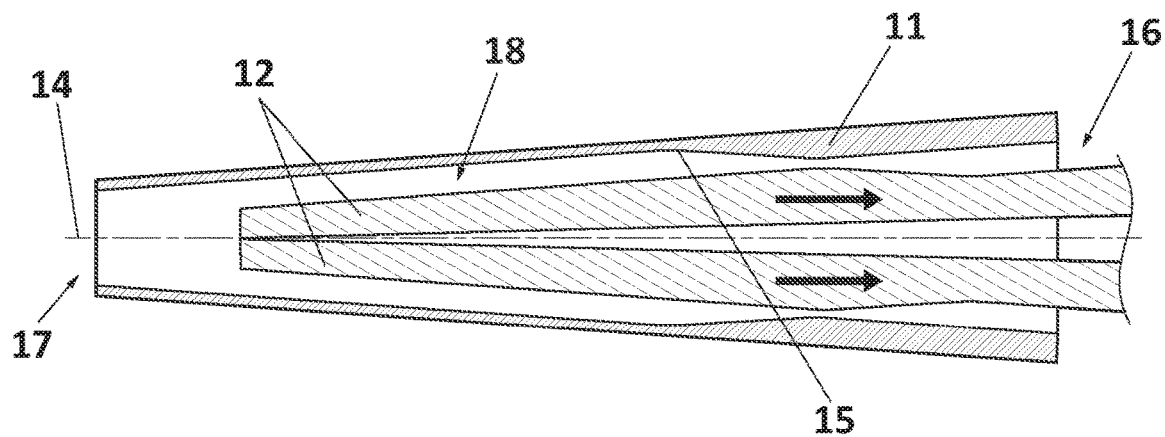

The device also comprises molding mandrels 12 which form the surface of the mold on which the composite part 11 is applied to be cured. As can be seen on FIG. 2b, the molding mandrels 12 may be extracted once the locking mandrel 13 has been fully extracted. To do so, the molding mandrels 12 are first displaced towards the space left open by the locking mandrel 13—in this case at least partially orthogonally to the longitudinal axis 14. Once the convex section of the molding mandrels 12 which is adapted to form the trapped section 15 of the cavity of the composite part are sufficiently separated from the inner surface of the composite part to be extracted through the root opening 16, the molding mandrels 12 are extracted longitudinally along the longitudinal axis 14 through the root opening 16, as represented on FIG. 2c.

Figure 3:
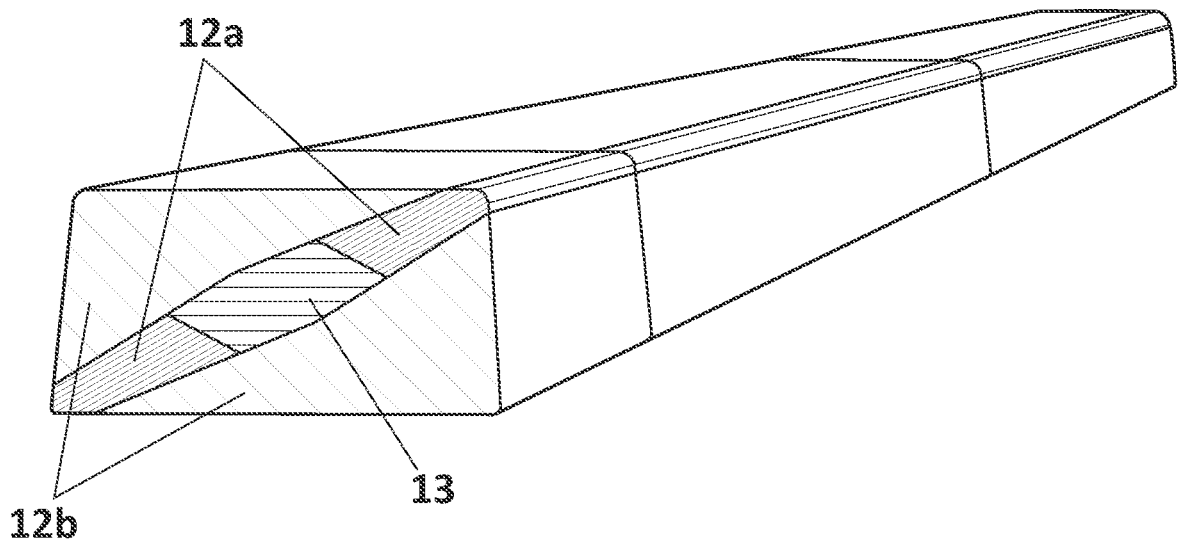
FIG. 3 is a schematic representation with a perspective view and a transversal cross-section of a second embodiment of a device according to the invention.

In FIG. 3 the detail of a cross-section of a device according to the invention is shown. In this embodiment, the device comprises a locking mandrel 13, and four molding mandrels 12a, 12b. The locking mandrel 13 is placed in between the molding mandrels 12a, 12b so as to maintain the molding mandrels 12a, 12b in their mold arrangement in which they form a surface adapted for the shaping of the internal cavity of a hollow composite part (not represented on this figure).

As can be seen on FIG. 3 and following FIGS. 4a-4d, the locking mandrel 13 does not contact the composite part 11.

Figure 4A:
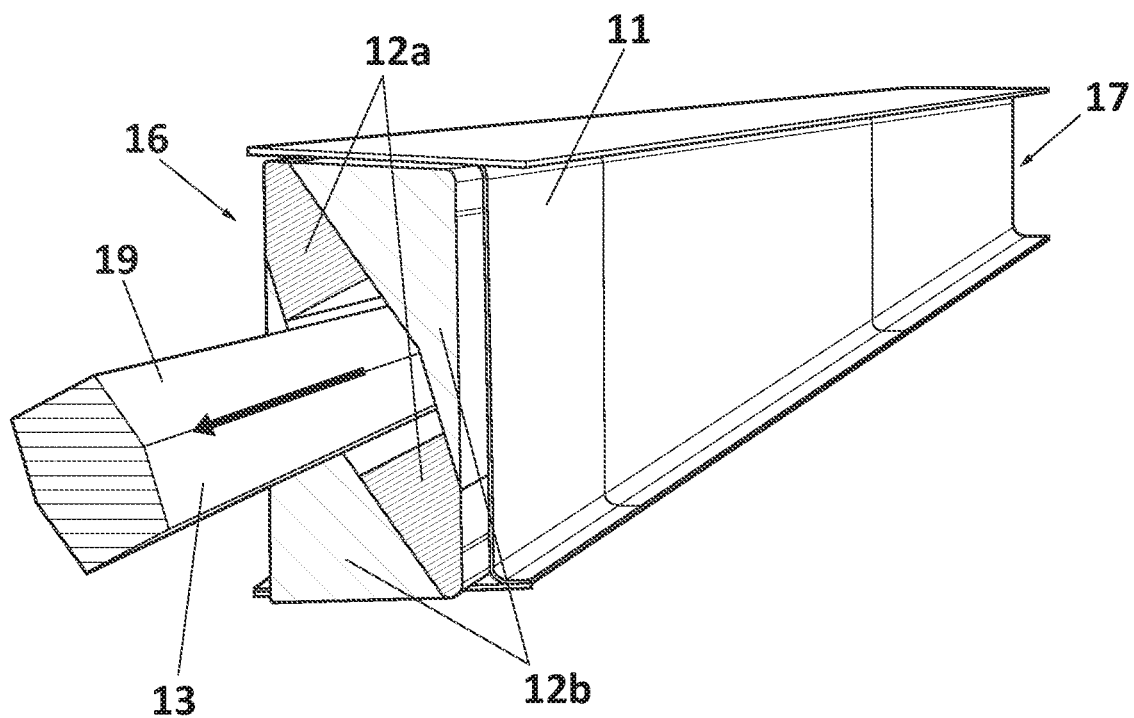
FIGS. 4a, 4b, 4c, 4d, 4e are schematic representations of steps of a method according to the invention with a device corresponding to that of FIG. 3.

On FIG. 4a, the extraction of the locking mandrel 13 along a longitudinal axis through a root opening 16 of a hollow composite part 11 is represented. This extraction is facilitated by the fact that the locking mandrel 13 also extends to the tip opening 17 of the composite part. Again, the locking mandrel 13 is conical in shape with a regular inclination along the longitudinal axis so as to facilitate its extraction from between the molding mandrels 12a, 12b. The locking mandrel 13 has a generally hexagonal cross-section with its faces in contact with faces of the molding mandrels in the mold arrangement. The faces of the mandrels which are in contact with other mandrels in the mold arrangement are beneficially as smooth as possible so as to facilitate the extraction of the locking mandrel 13.

The molding mandrels and/or the locking mandrel may be lubricated in order to facilitate their extraction by limiting the friction between two mandrels and between a mandrel and the composite part.

The molding mandrels 12a, 12b are divided in two sub-categories: two primary molding mandrels 12a and two secondary molding mandrels 12b. As can be seen on FIGS. 4b and 4c, the secondary molding mandrels 12b are trapped between the primary molding mandrels 12a and the composite part 11 as long as the primary molding mandrels 12a remain in their mold arrangement. Therefore, the primary molding mandrels 12a must be extracted sequentially before the secondary molding mandrels 12b. Such arrangement ensures a better geometry of the mold: the secondary molding mandrels 12b are mainly held in place by the primary molding mandrels 12a (and partly only by the locking mandrel 13), while the primary molding mandrels 12a are held in place by the locking mandrel 13.

The primary molding mandrels 12a have two faces 23 in contact with the composite part 11, the two faces being separated by only one angle. The two faces in contact thus form an open angle and are not opposite parallel faces. Their detachment from the composite part 11 is thereby facilitated.

The primary molding mandrels 12a have two faces 21 in contact with faces 20 of the secondary molding mandrels 12b. These two faces form an angle 27 of at least 3 degrees, and preferably, an angle of about 15 degrees. The upper limit for this angle depends upon the shape of the composite part. The inventors have determined that these angles are optimal to extract the primary molding mandrels 12a from their mold arrangement.

The portions of the faces 20 of the secondary molding mandrels 12b in contact with the locking mandrel 13 and the portions of the faces 20 of the secondary molding mandrels 12b in contact with the primary molding mandrels 12a are coplanar.

Moreover, the molding mandrels have no more than two different faces in contact with the composite part, such that they each cover only one angle of the cavity 18 formed in the composite part 11. This limits the stickiness of the mandrels to the composite part 11 when they have to be separated from the latter as represented in FIGS. 4c and 4d.

Figure 4B:
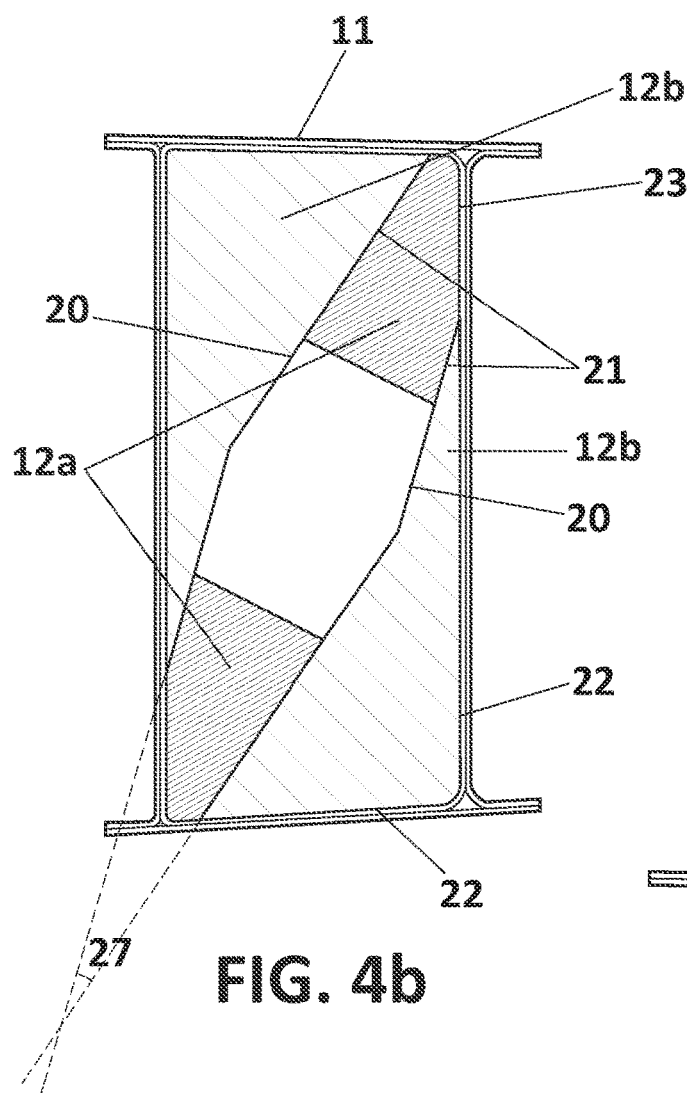
Figure 4C:
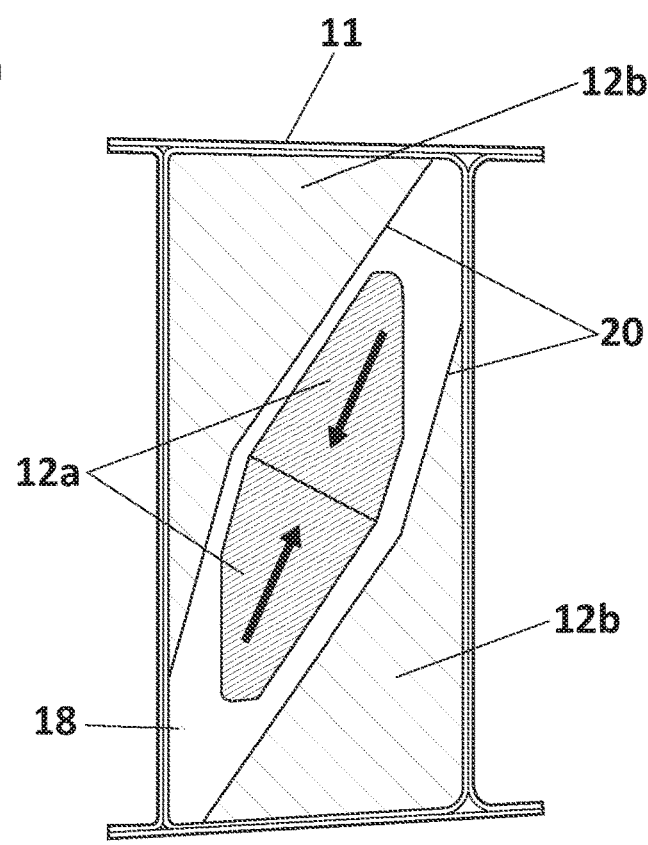
Figure 4D:
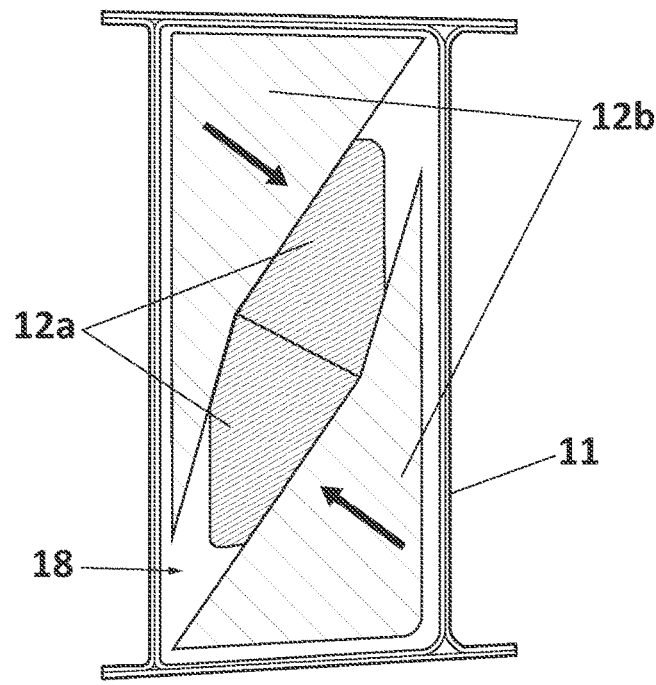

Once the locking mandrel 13 has been extracted from between the molding mandrels 12a, 12b, a space is left open within the mold arrangement, as can be seen on FIG. 4b. The primary molding mandrels 12a are then separated from the composite part 11 towards the space left open by the absence of the locking mandrel 13, and brought together as represented on FIG. 4c.

The two primary molding mandrels 12a may then be extracted longitudinally through the root opening 16.

Figure 4E:
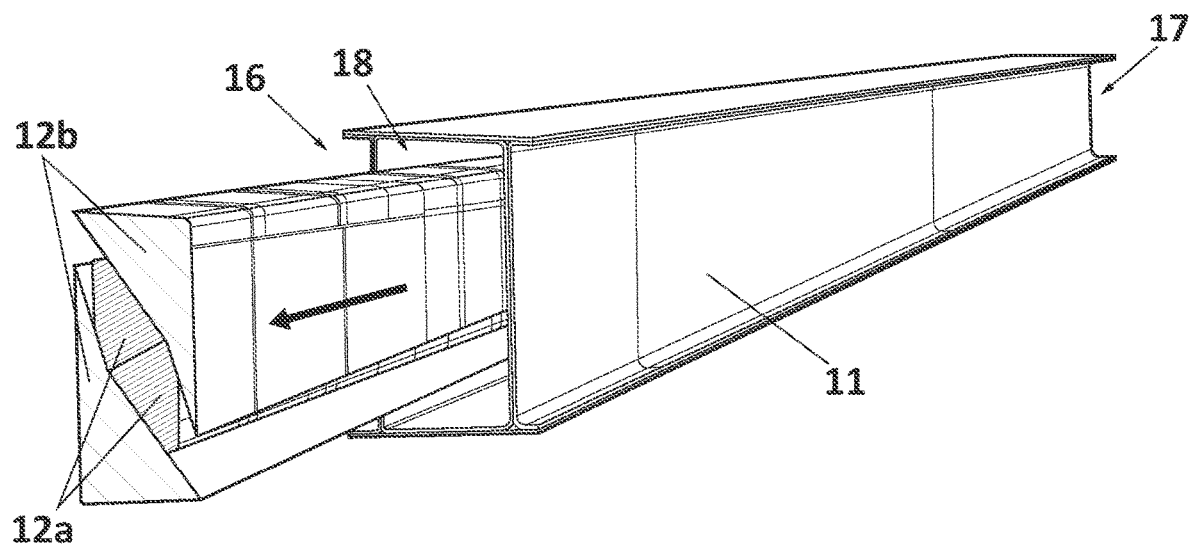

Alternatively however, thanks to the mutual shapes of the faces 21 of the primary molding mandrels 12a and of the faces 20 of the secondary molding mandrels 12b, and depending of the difference between the widest trapped section and the minimal section met from extraction through the root opening 16, the two secondary molding mandrels 12b may be separated from the composite part 11 while the two primary molding mandrels 12a are still in the cavity 18. The four molding mandrels 12a, 12b may then be extracted simultaneously longitudinally through the root opening 16 as represented on FIG. 4e.

Figure 5:
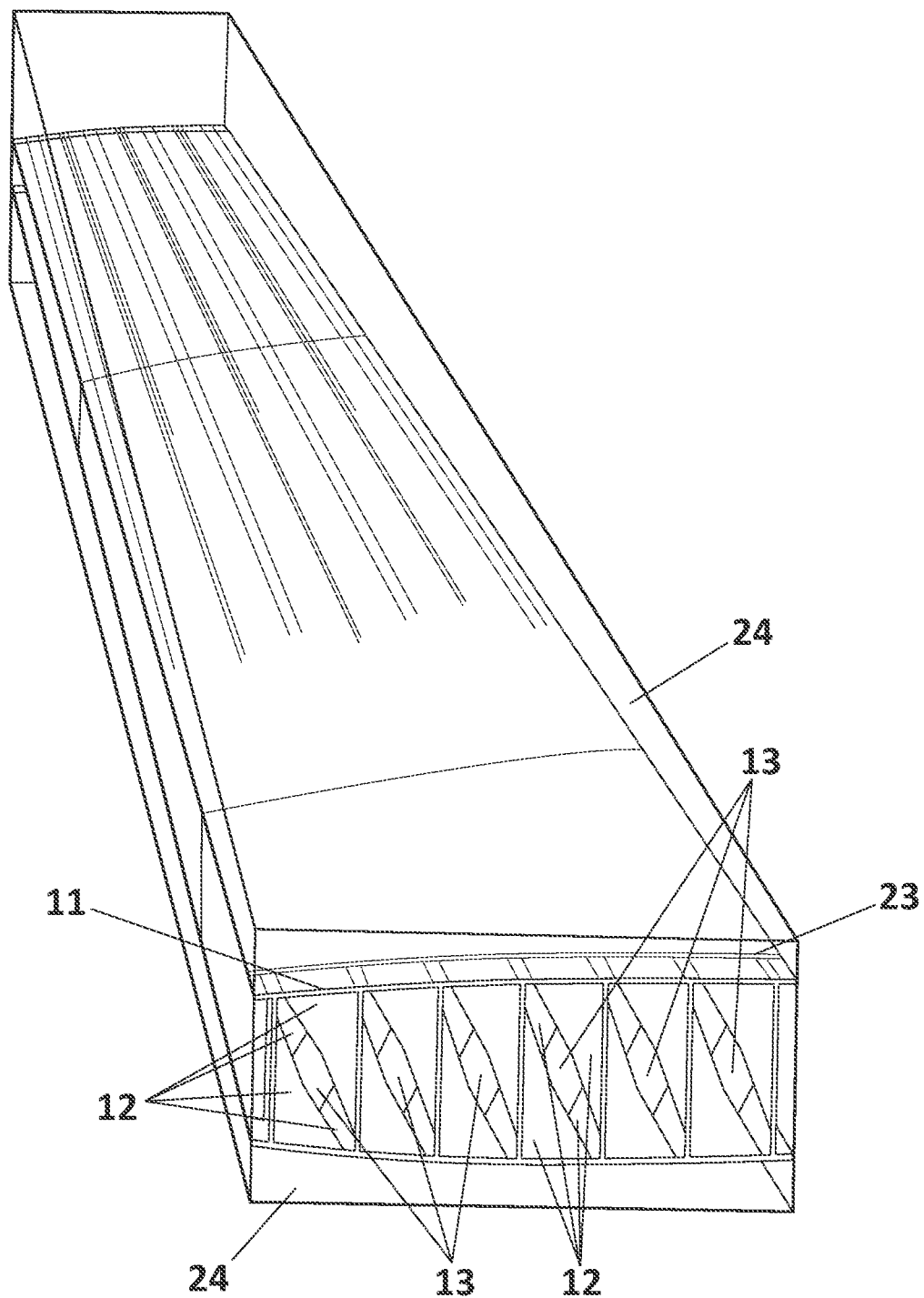
FIG. 5 is a schematic representation of with a perspective view and a transversal cross-section of a third embodiment of a device according to the invention.

In FIG. 5 a complex composite part 11 that may be obtained with a device of the invention is presented, with a device of the invention visible in cross-section.

The composite part comprises multiple cavities 18a, 18b, 18c, 18d, 18e, 18f. Each cavity may comprise a trapped-in section with at least one section wider than at least one other section on each of its sides longitudinally such that a single part mandrel may not be used.

In this embodiment, the device according to the invention comprises multiple sets, each set comprising four molding mandrels 12 and one locking mandrel 13. Each set is adapted to be arranged in a mold arrangement so as to form one of the cavities 18a, 18b, 18c, 18d, 18e, 18f of the composite part 11.

Figure 6A:
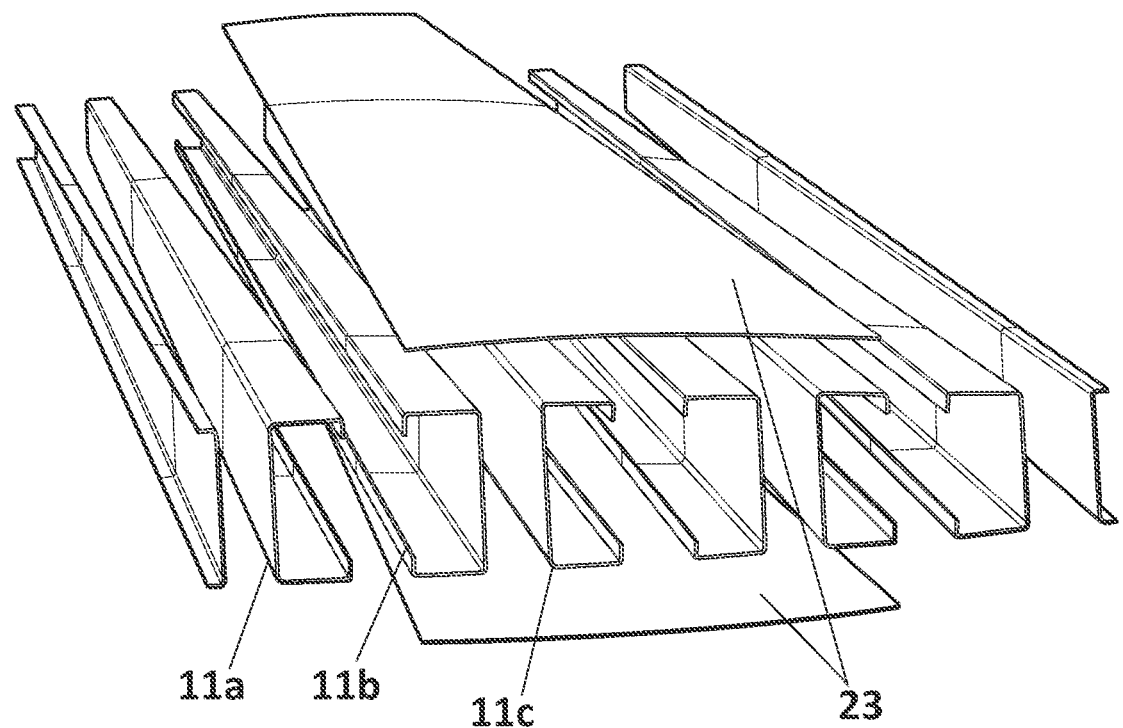
FIGS. 6a and 6b are schematic representations of a composite part that may be assembled together with a device of the invention, for example with the device of FIG. 5.

The device further comprises skin molds 24 adapted to provide a molding surface on the outer surface of the composite part 11. The skin molds 24 may be adapted to maintain skin parts 23 against the assembly of composite parts as well as the alignment between multiple composite parts 11a, 11b, 11c, 11d, 11e, 11f. In particular, as can be seen on FIG. 6a, multiple pre-impregnated composite parts may be brought together for final curing in which two pre-impregnated skin parts 23 are placed on the outer surfaces of the pre-impregnated composite parts 11a, 11b, 11c, 11d, 11e, 11f designed to form the cavities 18a, 18b, 18c, 18d, 18e, 18f and walls in the finished part 11.

Figure 6B:
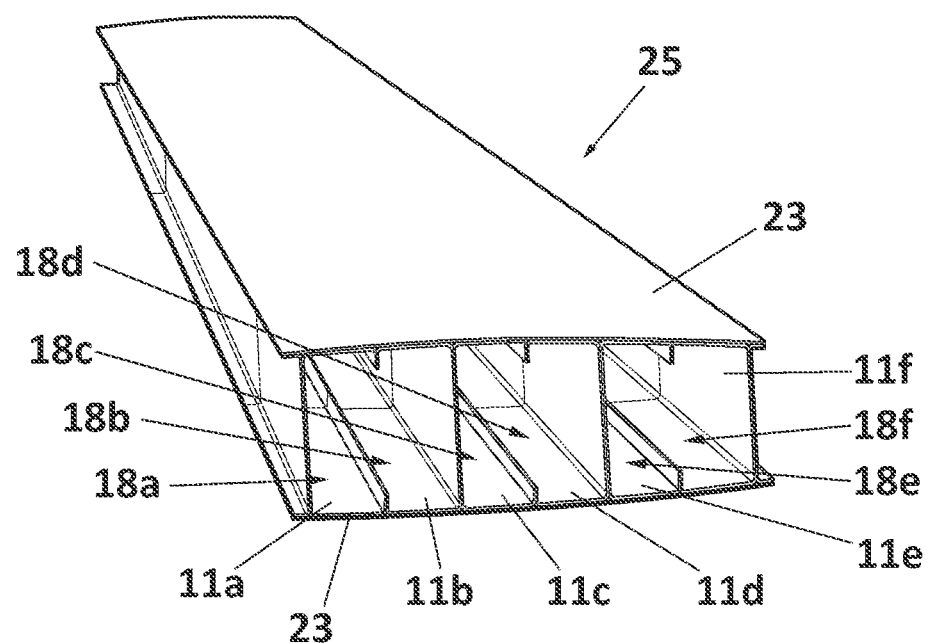

The finished part 25 as represented on FIG. 6b may be a one-piece multispar composite wing box. The invention allows the manufacture of such a part, including some recesses or trapped sections within one or more of the cavities of the wing box between the spars, so as to minimize the weight of the finished part. Moreover, the invention provides a device and a method in which the mandrels can be reused many times to manufacture multiple wing boxes of this type.

Figure 7:
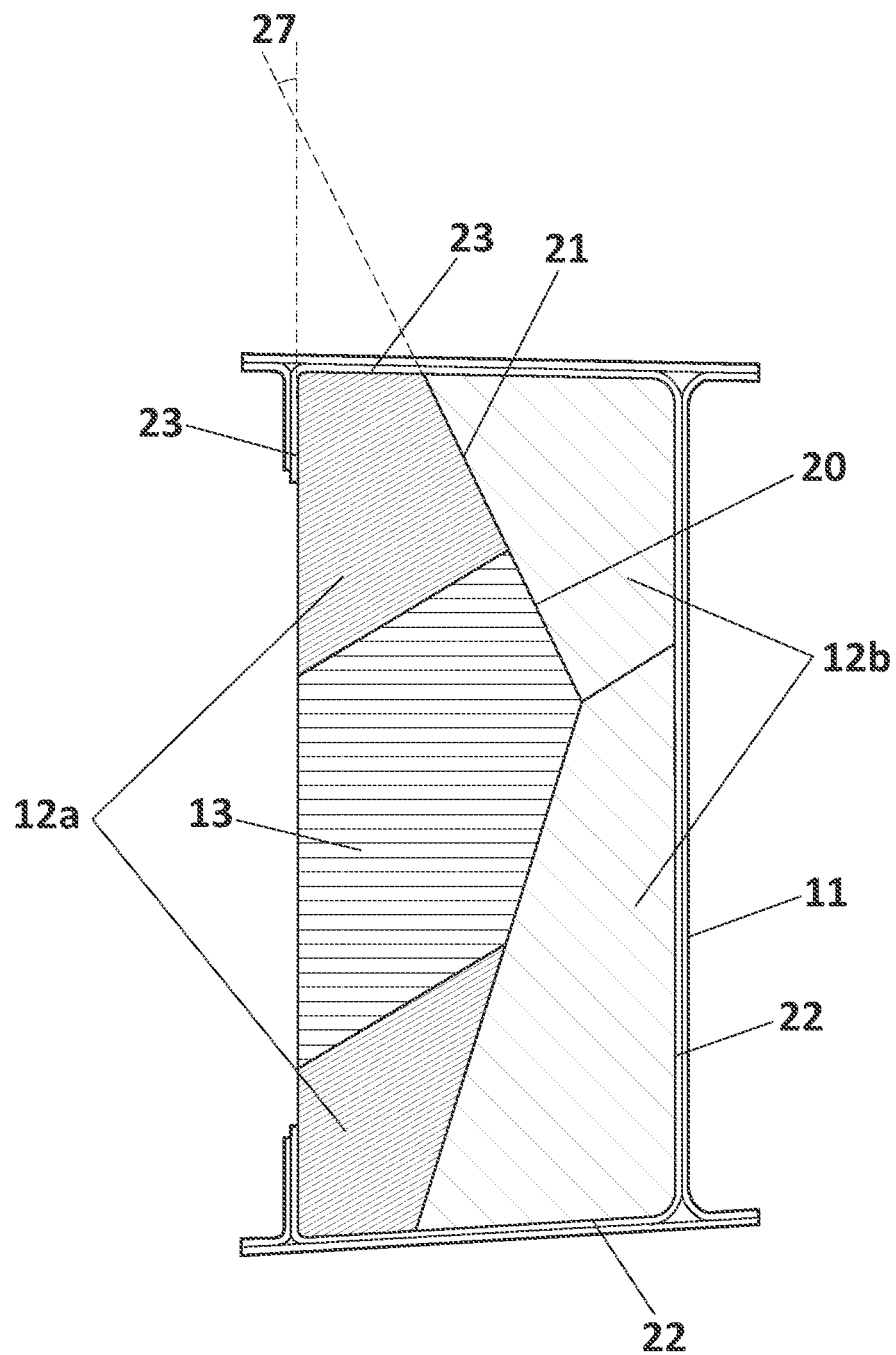
FIG. 7 is a cross-section schematic representation of a fourth embodiment of a device according to the invention.

In FIG. 7, another embodiment of a device according to the invention is represented. In this embodiment, a locking mandrel 13 maintains two primary molding mandrels 12a and two secondary molding mandrels 12b in a mold arrangement. In this embodiment, the locking mandrel 13 has a pentagonal cross-section.

In this embodiment, the molding mandrels 12 do not have sharp edges, contrary to the embodiment shown in and described in relation to FIG. 3. Not having sharp edges provides an easier demolding as well as a slower wear of the mandrel and avoids that it would be broken by a wrong manipulation.

Each primary molding mandrel 12a is adapted to have two faces 23 in contact with the composite part 11, one face in contact with the locking mandrel 13 and one face 21 in contact with one face 20 of the secondary molding mandrels 12b. The face 21 of the primary molding mandrels 12a in contact with a face 20 of a secondary molding mandrel 12b forms an angle and is not coplanar to any face 23 in contact with the composite part. Moreover, the face 21 of the primary molding mandrels 12a in contact with a face 20 of a secondary molding mandrel 12b forms an angle 27 of about 25 degrees between with a non-adjacent face 23 in contact with the composite part, so as to facilitate the extraction of the primary molding mandrel 12a from its mold arrangement position away from the inner surface of the composite part 11.

In this configuration each primary molding mandrels 12a is maintained in its mold arrangement position by the locking mandrel 13.

Figure 8A:
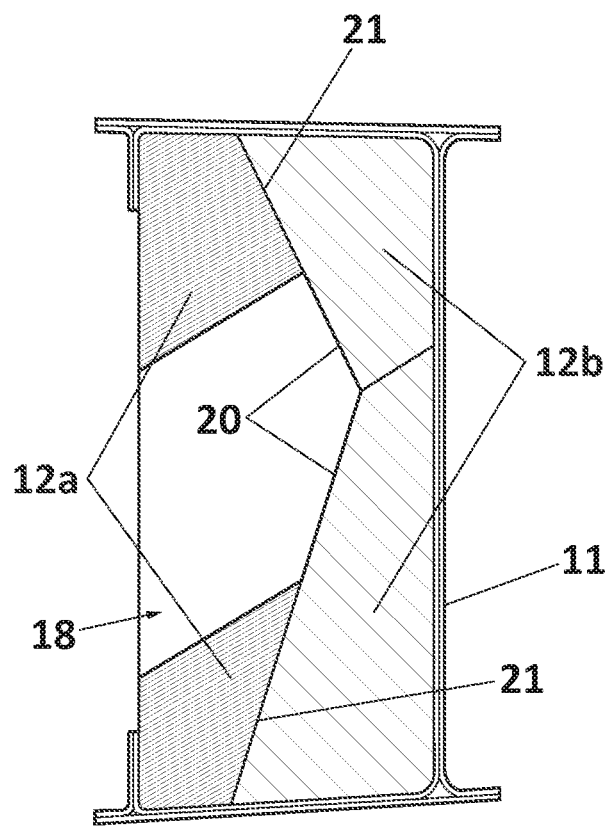
FIGS. 8a, 8b, 8c, 8d are schematic representations of steps of a method according to the invention with a device corresponding to that of FIG. 7.

In FIG. 8a the same device is represented with the locking mandrel 13 having been extracted, such that the cavity 18 appears. Each primary molding mandrels 12a maintains a secondary molding mandrel 12b in its mold arrangement position, such that the primary molding mandrels 12a must be separated from the composite part 11 before the secondary molding mandrel 12b may also be separated from the composite part 11.

Figure 8B:
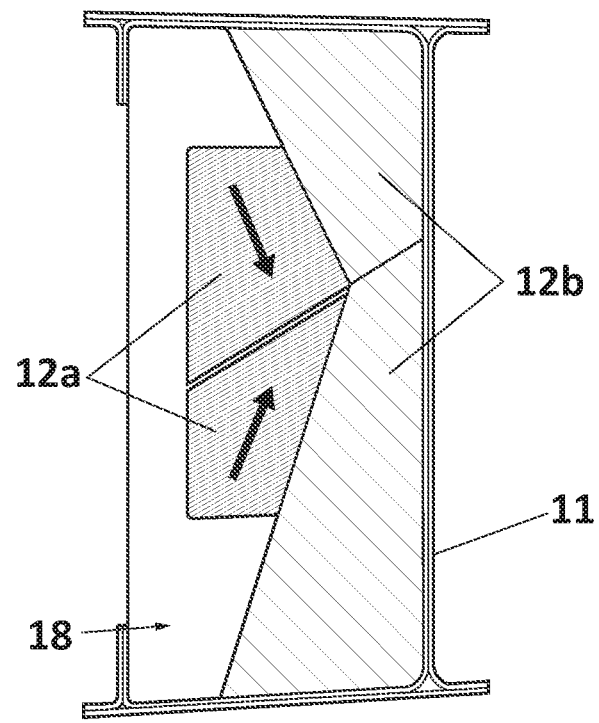

This is represented in FIG. 8b in which the two primary molding mandrels 12a are separated from the composite part 11 towards the cavity 18. The primary molding mandrels 12a may then be sequentially or simultaneously extracted longitudinally through a root opening so as to leave an even wider open cavity 18 as can be seen on FIG. 8c.

Figure 8C:
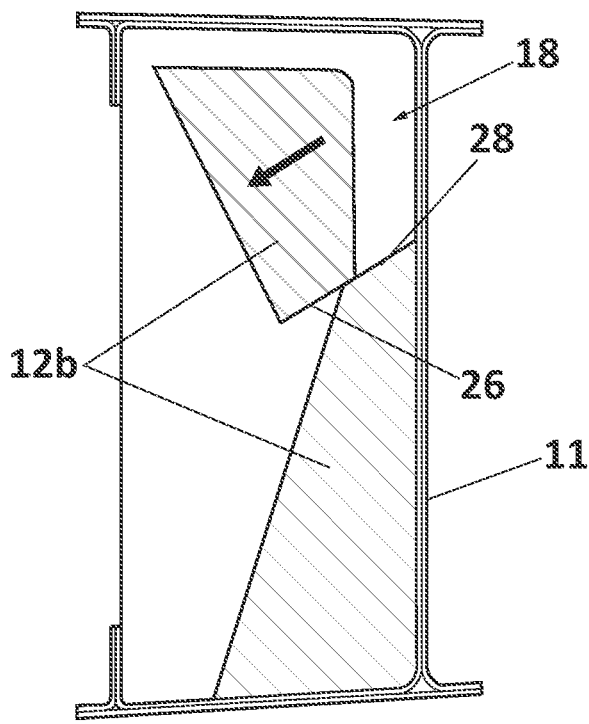

In FIG. 8c the extraction of a first secondary molding mandrel 12b is represented, whereby it is displaced away from a corner of the cavity 18 of the composite part 11. This first secondary molding mandrel 12b has a tilted surface with the second secondary molding mandrel 12b so as to allow, similarly to the primary molding mandrels 12a, an extraction of this first secondary molding mandrel 12b away and not along any face of the composite part in which it is in contact in the mold arrangement. Said otherwise, the face 26 of the first secondary molding mandrel 12b that is in contact with an adjacent face 28 of the second secondary molding mandrel 12b forms an angle and is not coplanar to any face of the first secondary molding mandrels 12b in contact with the composite part 11. The first secondary molding mandrel 12b thereby maintains the second secondary molding mandrel 12b in its mold arrangement, similarly to a primary molding mandrel.

Figure 8D:
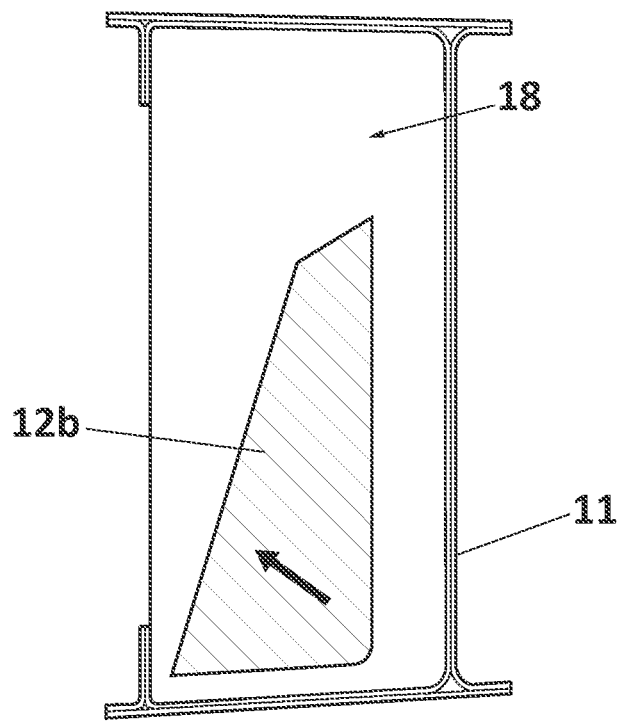

After longitudinal extraction of the first secondary molding mandrel 12b, the second secondary molding mandrel 12b may be extracted as represented on FIG. 8d, so as to leave the whole cavity 18 void of mandrels.

Figure 9A:
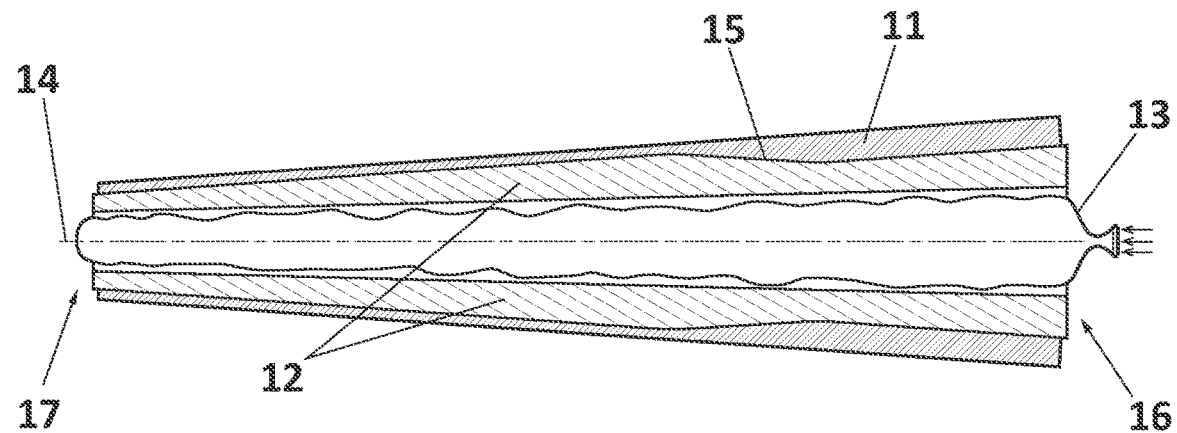
FIGS. 9a and 9b are schematic representations of a fifth embodiment of a device according to the invention.
Figure 9B:
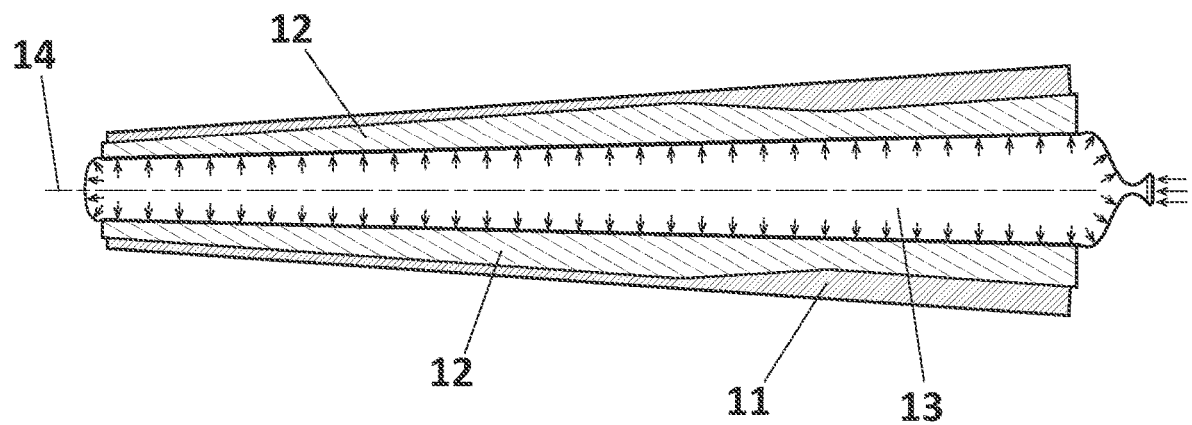

In FIGS. 9a and 9b, an alternative embodiment of a device and method of the invention are presented.

In this embodiment, the composite part 11 and the molding mandrels 12 are identical to the embodiment shown in and described in relation to FIG. 1. The composite part has a trapped-in section 15, a root opening 16, a tip opening 17.

The difference in this embodiment is in the nature of the locking mandrel 13. Instead of being a solid part, the locking mandrel 13 in this embodiment is inflatable. Although it is represented with the same molding mandrels 12 having a continuous inclination from tip to root, an inflatable locking mandrel 13 would allow for non-linear surfaces of the molding mandrels 12 in contact with the locking mandrel. Indeed, the deflation of the locking mandrel 13 would allow an extraction of it from between the molding mandrels 12, even if the molding mandrels 12 were forming a trapped-in section in between them.

In FIG. 9a the inflatable locking mandrel 13 is represented deflated so as to be introduced or extracted from between the molding mandrels 12.

In FIG. 9b the locking mandrel 13 is represented inflated. When inflated, the locking mandrel 13 exerts sufficient pressure on the molding mandrels 12 to maintain them in their mold arrangement. The fluid (for example air) pressure can be adjusted to allow a control of the compression of the composite part 11 during the curing process.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for manufacturing a composite part formed of composite materials comprising:
   at least four mandrels, called molding mandrels, configured to:
      be placed at least partially in contact with said composite part, and
      be arranged in a mold arrangement in which the molding mandrels form at least part of a mold for molding the composite part,
   a fifth mandrel, called a locking mandrel, configured to:
      be at least partially placed between the molding mandrels to maintain the molding mandrels in the mold arrangement, and
      be extracted from between the molding mandrels to release the molding mandrels from the composite part,
   wherein the locking mandrel is configured to extend, when placed between the molding mandrels, from one longitudinal end of the molding mandrels to another opposite longitudinal end of the molding mandrels such that two of the molding mandrels contact two other molding mandrels, and two of the molding mandrels contact only one other molding mandrel.

2. The device according to claim 1, wherein the composite part is a hollow part.

3. The device according to claim 1, wherein the molding mandrels and the locking mandrel are configured so that when the locking mandrel is in between the molding mandrels in the mold arrangement, the locking mandrel may not contact the composite part.

4. The device according to claim 1, wherein, in the mold arrangement, each molding mandrel is in contact with at most two distinct faces of the composite part.

5. The device according to claim 1, wherein the at least four mandrels are limited to only four molding mandrels and only one locking mandrel.

6. The device according to claim 1, wherein the locking mandrel has a hexagonal cross-section.

7. The device according to any claim 1, wherein at least one molding mandrel, called a primary molding mandrel, locks at least one other molding mandrel, called a secondary molding mandrel, in a mold arrangement position.

8. The device according to claim 7, wherein the primary molding mandrel has two faces in contact with one or more secondary molding mandrels, and wherein these two faces form an angle of between 3 degrees and 45 degrees.

9. The device according to claim 7, wherein two primary molding mandrels form opposite angles of the mold arrangement.

10. The device according to claim 1, wherein an external face of a molding mandrel configured to form at least part of the mold is concave.

11. The device according to claim 1, further comprising multiple sets, each set comprising at least four molding mandrels and at least one locking mandrel.

12. The device according to claim 1, wherein the locking mandrel is inflatable.

* * * * *